United States Patent [19]

Dicker et al.

[11] Patent Number: 4,588,795

[45] Date of Patent: May 13, 1986

[54] OXYANION-CATALYZED POLYMERIZATION

[75] Inventors: Ira B. Dicker; William B. Farnham, both of Wilmington, Del.; Walter R. Hertler, Kennett Square, Pa.; Evan D. Laganis; Dotsevi Y. Sogah, both of Wilmington, Del.; Thomas W. Del Pesco, Hockessin, Del.; Patrick H. Fitzgerald, Pitman, N.J.

[73] Assignee: E. I. Du Pont de Nemours and Company, Wilmington, Del.

[21] Appl. No.: 707,193

[22] Filed: Mar. 1, 1985

[51] Int. Cl.$^4$ .............................................. C08F 4/16
[52] U.S. Cl. ................................. 526/192; 526/184; 526/190; 526/194
[58] Field of Search ................ 526/184, 190, 192, 194

[56] References Cited

U.S. PATENT DOCUMENTS

| | | | |
|---|---|---|---|
| 3,778,430 | 12/1973 | Citron | 526/194 |
| 4,041,227 | 8/1977 | Uraneck | 526/190 |
| 4,389,514 | 6/1983 | Schmidle | 526/184 |
| 4,414,372 | 11/1983 | Farnham | 526/194 |
| 4,417,034 | 11/1983 | Webster | 526/190 |
| 4,447,628 | 5/1984 | Farnham | 526/194 |

OTHER PUBLICATIONS

C. D. Eisenbach, V. Jaacks, H. Schnecko, and W. Kern, *Makromol. Chem.*, 175, 1329 (1974).

V. Jaacks, C. D. Eisenbach, and W. Kern, *Makromol. Chem.*, 161, 139 (1972).

C. D. Eisenbach, G. Franzmann, V. Jaacks, H. Schnecko, and W. Kern, *Makromol. Chem.*, 175, 1789 (1974).

H. Balard and J. Meybeck, *Eur. Polym. J.*, 13, 611 (1977).

T. Ogawa and P. Quintana, *J. Polym. Sci., Polym. Chem. Ed.*, 13, 2517 (1975).

*Primary Examiner*—Paul R. Michl

[57] ABSTRACT

This invention resides in a polymerization process which is catalyzed by an oxyanion which can form a conjugate acid having a pKa (DMSO) of about 5 to about 24.

52 Claims, No Drawings

OXYANION-CATALYZED POLYMERIZATION

BACKGROUND OF THE INVENTION

1. Field of the Invention

This invention resides in a polymerization process which is catalyzed by oxyanions, and to polymers produced thereby.

2. Background

U.S. Pat. Nos. 4,414,372; 4,417,034; 4,524,196; and 4,508,880 and commonly assigned U.S. patent applications Ser. Nos. 660,588 and 660,589, filed Oct. 18, 1984; 673,926, filed Nov. 21, 1984; and 676,099, filed Nov. 29, 1984, hereinafteer referred to as "the aforesaid patents and applications", disclose processes for polymerizing polar monomers to "living" polymers. In certain of the aforesaid patents and applications there is disclosed a process of preparing a "living" polymer, the process comprising contacting under polymerizing conditions at least one polar monomer with (i) a polymerization initiator compound comprising a tetracoordinate metal selected from Si, Ge and Sn having at least one activating substituent or activating diradical attached thereto, and (ii) a suitable co-catalyst, the polymerization being characterized by the presence, in the growing and in the grown polymer, of a moiety containing said metal at "living" ends and said activating substituent or diradical, or a tautomer thereof, at "nonliving" ends of said polymer, the initiator optionally having one or more substituents that are inert under polymerizing conditions. The aforesaid patents and applications also disclose processes of polymerizing the monomer selected from the group consisting of $CH_2=C(Y)X$,

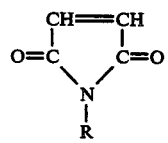

and mixtures thereof wherein:

X is $-CN$, $-CH=CHC(O)X'$ or $-C(O)X'$;

Y is $-H$, $-CH_3$, $-CN$ or $-CO_2R$, provided, however, when X is $-CH=CHC(O)X'$, Y is $-H$ or $-CH_3$;

X' is $-OSi(R^1)_3$, $-R$, $-OR$ or $-NR'R''$; each $R^1$, independently, is a hydrocarbyl radical which is an aliphatic, alicyclic, aromatic or mixed aliphatic-aromatic radical containing up to 20 carbon atoms;

R is a hydrocarbyl radical which is an aliphatic, alicyclic, aromatic or mixed aliphatic-aromatic radical containing up to 20 carbon atoms, optionally containing one or more ether oxygen atoms within aliphatic segments thereof and optionally containing one or more functional substituents that are unreactive under polymerizing conditions; and each of R' and R'' is independently selected from $C_{1-4}$ alkyl by contacting the one or more monomers under polymerizing conditions with:

(i) the initiator of the formula $(R^1)_3MZ$ wherein:
$R^1$ is as defined above;
Z is an activating substituent selected from the group consisting of

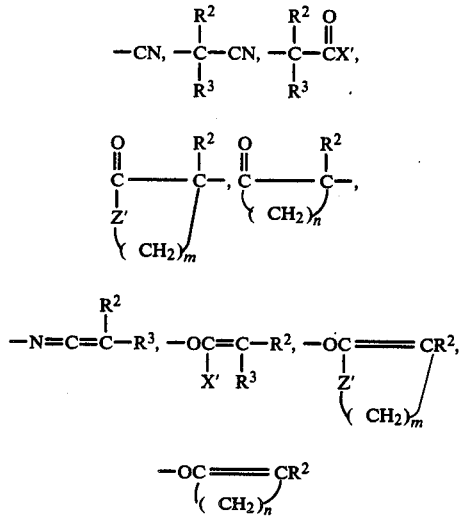

and mixtures thereof wherein:

X' is as defined above for the monomer; each of $R^2$ and $R^3$ is independently selected from H and hydrocarbyl, defined as for R above;

Z' is O or NR' wherein R' is as defined above;

m is 2, 3 or 4;

n is 3, 4 or 5; and

M is Si, Sn, or Ge, provided, however, when Z is

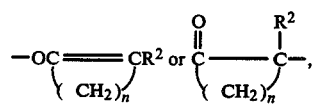

M is Sn or Ge; and (ii) a co-catalyst which is a source of bifluoride ions $HF_2^-$, or a source of fluoride, cyanide or azide ions or a suitable Lewis acid, for example, zinc chloride, bromide or iodide, boron trifluoride, alkylaluminum oxide or an alkylaluminum chloride, to produce "living" polymer having repeat units of the one or more monomers, said processes further characterized in that:

(a) $R^1$ is H, provided that at least one $R^1$ group is not H; and/or (b) R is a polymeric radical containing at least 20 carbon atoms and optionally containing one or more ether oxygen atoms within aliphatic segments thereof and optionally containing one or more functional substituents that are unreactive under polymerizing conditions; and/or (c) at least one of any R group in the monomer contains one or more reactive substituents of the formula $-Z'(O)C-C(Y^1)=CH_2$ wherein $Y^1$ is H or $CH_3$ and Z' is as defined above; and/or (d) the initiator is of the formula $(R^1)_2M(Z^1)_2$ or $O[M(R^1)_2Z^1]_2$ wherein $R^1$ and M are as defined above and $Z^1$ is

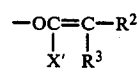

wherein X', $R^2$ and $R^3$ are as defined above; and/or (e) at least one of any R, $R^2$ and $R^3$ in the initiator contains one or more initiating substituents of the formula $-Z^2-M(R^1)_3$ wherein M and $R^1$ are as defined above; and $Z^2$ is a diradical selected from the group consisting of

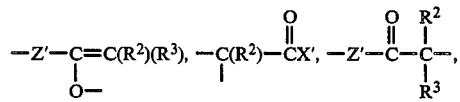

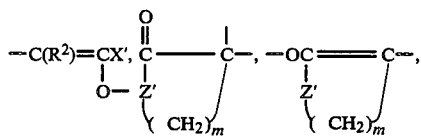

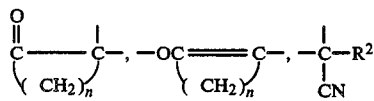

and mixtures thereof, wherein $R^2$, $R^3$, $X'$, $Z'$, m and n are as defined above, provided, however, when $Z^2$ is

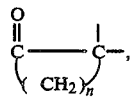

M is Sn or Ge; and/or (f) Z is selected from the group consisting of $-SR$, $-OP(NR'R'')_2$, $-OP(OR^1)_2$, $-OP[OSi(R^1)_3]_2$ and mixtures thereof, wherein R, $R^1$, $R'$ and $R''$ are as defined above; and/or (g) $R^2$ and $R^3$ taken together are

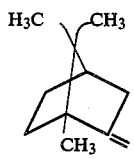

provided, however, Z is

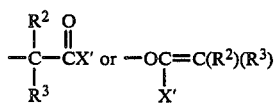

and/or $Z^2$ is

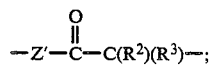

and/or (h) X' and either $R^2$ or $R^3$ taken together are

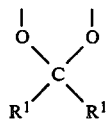

provided, however, Z is

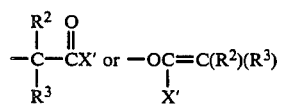

and/or $Z^2$ is

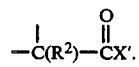

As further disclosed in the aforesaid patents and applications, although these processes resemble anionic polymerization, there are significant differences which have commercial significance. These differences include the ability to copolymerize methacrylate and acrylate monomers, or combinations of acrylate monomers, for example, ethyl and sorbyl acrylates, to relatively monodisperse copolymers. Such copolymers are difficult or impossible to obtain by known processes such as anionic polymerization or free-radical polymerization. Moreover, whereas anionic polymerization processes which provide relatively monodisperse polymers are carried out at low temperatures, usually well below $-10°$ C., which require expensive refrigeration equipment for commercial operation, the polymerization processes of the patents are operable over a wide temperature range, from about $-100°$ C. to about $150°$ C., and they are conveniently operable with many commercially important monomers at about ambient temperatures.

Commonly assigned copending application Ser. No. 618,736, filed June 8, 1984, and allowed Sept. 9, 1985, discloses certain tris(disubstituted amino)sulfonium perfluoroalkoxides, including tris(dimethylamino)-sulfonium trifluoromethoxide, and the use of this compound as a catalyst in the polymerization processes of U.S. Pat. Nos. 4,414,372 and 4,417,034. Such use is outside the scope of the invention which is disclosed and claimed hereinbelow, since tris(dimethylamino)-sulfonium trifluoromethoxide is not a salt comprising an oxyanion which can form a conjugate acid having the requisite pKa.

It is an object of this invention to provide additional catalysts (referred to in the aforesaid patents and applications as "co-catalysts") which can be used in the processes disclosed in the aforesaid patents and applications. Another object is to provide processes which are similar to the processes disclosed in the aforesaid patents and applications in that they can be carried out with the same monomers and initiators to produce the same "living" polymers, but differing in the type of catalyst used. Still another object is to provide catalysts which are suitable in the processes of the aforesaid patents and applications but which are inoperable in conventional art-recognized anionic processes for polymerizing the same type of monomer. A further object is to provide such catalysts which are readily and eco-

DETAILED DESCRIPTION OF THE INVENTION

The invention herein resides in the polymerization process comprising contacting under polymerizing conditions at least one polar monomer with (i) a polymerization initiator compound comprising a tetracoordinate element selected from Si, Ge and Sn having at least one activating substituent or activating diradical attached thereto, said radical or diradical optionally having one or more substituents that are inert under polymerizing conditions, and (ii) a catalyst which is a salt comprising a suitable cation and an oxyanion which can form a conjugate acid having a pKa (DMSO) of about 5 to about 24, preferably about 6 to about 21, more preferably 8 to 18. Also preferably, the polymer produced is "living" in that the polymerization is characterized by the presence, in the growing and in the grown polymer, of a moiety containing the aforesaid element at "living" ends and the activating substituent or diradical, or a tautomer thereof, at "nonliving" ends of the polymer.

By conjugate acid is meant the acid formed by protonating the catalytic oxyanion; for example, the conjugate acid of acetate anion is acetic acid, and that of biacetate anion is acetic acid dimer. By pKa (DMSO) of the conjugate acid is meant the negative logarithm of the acidity constant of the conjugate acid, measured in dimethylsulfoxide (DMSO) at 25° C. Methods for measuring pKa values of various acidic compounds, including oxyacids, are abundantly described in the literature, for example, by F. G. Bordwell et al., J. Org. Chem., 45, 3305 (1980); 46, 4327 (1981); 47, 3224 (1982); and 49, 1424 (1984). A general review of pKa and oxyanion behavior in organic solvents is provided by M. M. Davis in "Acid-Base Behavior in Aprotic Organic Solvents," Natl. Bur. Stand. Monograph, p. 105 (1968).

Oxyanion salts which are operable in the present invention contain cations that are inert under polymerizing conditions, yet render the catalyst available in the polymerizing medium; the medium can include one or more solubilizing agents, such as crown ethers. The cations may be pendant functions on a polymeric backbone, as, for example, in polyamine salts. Preferably, the cation is a quaternary ammonium or tris(dialkylamino)sulfonium (TAS) cation or an alkali or alkaline earth metal. More preferably, the cation is tetraalkylammonium or tris(dialkylamino)sulfonium (TAS) wherein the alkyl group contains 1 to 20 carbon atoms, preferably 1 to 8 carbon atoms. Most preferably, the cation is tetraethylammonium, tetra(n-butyl)ammonium or tris(dimethylamino)sulfonium.

Oxyanion sources which are particularly useful in the present invention include salts of carboxylic and bicarboxylic acids, sulfinic acids, phosphinic and phosphoric acids, phenols and biphenols, nitrous and cyanic acids, trihydrocarbylsilanols, and higher oligomeric forms of these acids, having the aforesaid pKa. Included among such acids are those of the formula $[Q(X^1OH)_p]_q$ wherein $X^1$ is C(O), S(O) or a single bond, p is an integer and is at least 1, q is an integer and is at least 1, preferably 1 or 2, and Q, of valence p, is CN, N(O), P(O), PH(O), $R^4$ or $R_3{}^4Si$ wherein each $R^4$, taken independently, is $C_{1-20}$ hydrocarbyl or a polymeric radical containing at least 20 carbon atoms, optionally having substituents that are inert under polymerizing conditions, or optionally interrupted within aliphatic segments thereof with one or more heteroatoms, such as ether oxygen or thioether sulfur, or one or more keto groups. Preferably, $X^1$ is C(O) or a single bond, Q is $R^4$, which preferably is $C_{1-8}$ hydrocarbyl or substituted $C_{1-8}$ hydrocarbyl, and q is 1 or 2; more preferably, Q is $R^4$ which is phenyl, substituted phenyl or $C_{1-8}$ alkyl. Preferred anions are also ambident, that is, they are anions which can react at more than one site. Representative examples of ambident oxyanion catalysts include acetate, biacetate, benzoate, bibenzoate, cyanate, nitrite, 4-nitrophenolate and bi(4-nitrophenolate). Representative substituents that are inert under polymerizing conditions include —CN, —NO$_2$, —OCH$_3$, —CH$_3$, —CF$_3$, —Cl, —F, —O$_2$SCH$_3$ and —N(CH$_3$)$_2$, provided that when the substituent is —F, the carbon atom adjacent to —X$^1$— is unsubstituted.

As is already evident from the above, the oxyanions which are useful as catalysts in the process of the invention include associated or hydrogen-bonded anions, such as bianions which can be formed from one or more of the above acids, for example, by treating a monoanion salt or a related base, such as tetrabutylammonium hydroxide, with one or more of the aforesaid acids; such oxyanions are usually preferred herein. Non-limiting examples of such oxyanions include bicarboxylates of the formula (RCO$_2$)$_2$H wherein R is as defined above (each R selected independently), such as biacetate, bibenzoate, bi(4-nitrobenzoate) and bi(4-dimethylaminobenzoate); bi(4-nitrophenolate) and biphenolate; and RCO$_2$HF, wherein R is as defined above, such as acetobifluoride.

As equilibria are believed to be established between mono- and bianions and the one or more acids, operable oxyanion catalysts include mixtures comprising salts of mono- and/or bianions and their conjugate acids. Preferred oxyanion catalysts are prepared by adding to one equivalent of a monooxyanion source about 0.1 to about 2 equivalents, preferably about 1 equivalent, of its conjugate acid; such treatment results in partial or complete conversion of monoanion to bianion. Although more than about 2 equivalents of conjugate acid may be tolerated, it must be kept in mind tht the acid may react with the initiator and thus reduce the concentration of initiator below its desired level. For this reason, therefore, substantial excesses of conjugate acid are to be avoided. Stated in another way, small amounts of free conjugate acid remaining associated with mono- and/or bioxyanion salts as a consequence of their preparation can be tolerated without deleterious effect on the polymerization process. Such is demonstrated in Examples 14 and 46.

Representative oxyanion source compounds which are operable herein include the TAS and the tetramethyl-, tetraethyl- and tetra(n-butyl)ammonium salts of the following anions (the pKa values of the corresponding conjugate acids, if available in the art, are given in parentheses): nitrite ONO—, cyanate CNO—, acetate (11.5), cyanoacetate (6.3), benzoate (10.5), 3-chlorobenzoate (9.5), 4-chlorobenzoate (10.1), 4-methoxybenzoate (11.0), 4-cyanobenzoate (8.9), 4-nitrobenzoate (9.0), 3-nitrobenzoate (9.2), 2-nitrobenzoate (8.1), 4-trifluoromethylbenzoate (9.5), 4-methylsulfinylbenzoate (9.1), 4-nitrophenolate (11.0), 3-nitrophenolate (13.7), 2-nitrophenolate (11.9), 4-fluorophenolate (17.6), 4-cyanophenolate (13.1), 2,4,6-trichlorophenolate (10.2), phenolate (18.1), 4-methoxyphenolate (18.2), 4-ethoxyphenolate (23.8), p-toluenesulfinate, pentafluorophenolate (8.8), pentachlorophenolate (7.1), d-10-camphorsulfinate, picolinate, acrylate (10.5), pentanoate, octanoate, trimethylacetate, 2-ethylhexanoate, 2-methylphenolate, 4-methylphenolate, 6-trifluoromethyl-4-thiahexanoate, trimethylsilanolate, salicylate (6.8), N-methyl-p-toluenesulfonamidate, phenylphosphinate, and the bianions previously listed hereinabove.

As demonstrated and disclosed in the examples hereinafter, monomer is preferably fed to the reaction vessel after the oxyanion catalyst source compound, initiator and solvent, if any, have been charged. The oxyanion catalyst source compound can be added as a solution in a suitable non-aqueous solvent, such as tetrahydrofuran, toluene, trifluoromethylbenzene or acetonitrile. Alternatively, a solution of monooxyanion catalyst source may be treated in situ (in the reaction vessel) with one or more oxyacids having pKa values in the aforesaid range, to provide bianions as previously described. The concentration of catalyst as well as the initiator and monomer concentrations employed in the polymerization are the same as disclosed in the aforesaid patents and applications, as are the other conditions employed in the polymerization process of this invention.

As illustrated in Example 48 herein, the oxyanion catalysts of the present invention are also useful in the process of aforementioned application Ser. No. 676,099 wherein selected chain-transfer agents are employed.

In the following examples, the molecular weights of the polymer products ($\overline{M}_w$ and $\overline{M}_n$) were measured by gel permeation chromatography (GPC). The polydispersity of the polymer is defined by $D = \overline{M}_w/\overline{M}_n$. Unless otherwise specified, any "living" polymer products which were obtained were quenched by exposure to moist air or methanol before molecular weights were determined. All temperatures are in degrees Celsius.

EXAMPLE 1

Polymerization of Methyl Methacrylate Catalyzed by Trimethylsilanolate Ion

Twenty-five mg of potassium trimethylsilanolate dissolved in tetrahydrofuran (THF) was added to 0.70 mL of [(1-methoxy-2-methyl-1-propenyl)-oxy]trimethylsilane (MTS); 5 mL of methyl methacrylate (MMA) was added by syringe to this mixture. The temperture rose immediately, reaching 65°. After the temperature returned to 30°, 4 mL of MMA was added. The temperature again rose to 65° and the solution became very viscous, indicating further polymerization of the initially-formed "living" polymer. After 1.25 h another 4 mL of MMA was added; no exotherm was noted.

EXAMPLE 2

Part A. Trimethylsilyl p-Toluenesulfinate p-Toluenesulfinic acid (20.6 g, 0.13 mol) was suspended in hexamethyldisilazane (25 mL). This mixture was heated at reflux for 2 h under nitrogen, at which time ammonia evolution ceased. The resulting cloudy solution was then cooled to room temperature before removing volatiles under vacuum (0.025 mm). The remaining oil was then fractionated through vigorously dried glassware to give trimethylsilyl p-toluenesulfinate (18.2 g, 61% yield) as a colorless oil: bp 65°–67° (0.065 mm); $^1$H NMR (CDCl$_3$): 0.2 (s, —SiMe$_3$, 9H), 2.3 (s, CH$_3$—Ph—, 3H), and 7.3 ppm (ABq, J = 8.4 Hz, $\Delta\nu_{1-3}$ = 27.3 Hz, Ph—H's, 4H). Anal. Calcd. for C$_{10}$H$_{16}$O$_2$SiS: C, 52.59; H, 7.06; Si, 12.30. Found: C, 52.19; H, 6.86, Si, 11.92.

Part B. Tris(dimethylamino)sulfonium(TAS) p-Toluenesulfinate

Trimethylsilyl p-toluenesulfinate from Part A (12.00 g, 52.5 mmol) was added dropwise to a stirred solution of tris(dimethylamino)sulfonium(TAS) trimethyldifluorosilicate (14.47 g, 52.5 mmol) in "degassed" acetonitrile (50 mL) cooled to 0° under nitrogen. The resulting solution was stirred for 30 min before warming it to room temperature. The volatiles were removed under vacuum (0.025 mm) to give tris(dimethylamino)sulfonium p-toluenesulfinate (16.58 g, 99% yield) as a white crystalline solid: mp 90°–96°; $^1$H NMR (CDCl$_3$): 2.30 (s, CH$_3$—Ph—, 3H), 2.81 (s, (CH$_3$)$_2$N, 18H) and 7.37 (ABq, J = 5.9 Hz, $\Delta\nu_{1-3}$ = 38.4 Hz, Ph—H's, 4H); $^{19}$F NMR showed that there were no fluorine-containing impurities present. Anal. Calcd. for C$_{13}$H$_{25}$N$_3$O$_2$S$_2$: C, 48.87; H, 7.89; N, 13.15; S, 20.07. Found: C, 48.77; H, 8.03; N, 13.63; S, 19.72.

Part C. Polymerization of Methyl Methacrylate Catalyzed by TAS p-Toluenesulfinate To a solution of 5 mL of MMA and 0.7 g of MTS in tetrahydrofuran (THF) at 23° was added a solution of 0.05 g of the catalyst compound prepared as in Part B, in 1:1 THF/acetonitrile. The temperature rose slowly to about 47°. After 45 minutes, another 5 mL of MMA was added and the temperature rose as before. After 1 h at room temperature, a third 5 mL portion of MMA was added and the temperature rose to about 44°, indicating further polymerization, a clear indication that the polymer was "living". Evaporation of volatiles gave 18.8 g of polymer. GPC: $\overline{M}_n$ 3390, $\overline{M}_w$ 4820, D 1.42.

When TAS d-10-camphorsulfinate was substituted for TAS p-toluenesulfinate in Part C, exothermic polymerization of MMA was similarly effected.

EXAMPLE 3

Part A. Tris(dimethylamino)sulfonium 4-Nitrophenolate

[(4-Nitrophenyl)oxy]trimethylsilane (11.5 mL, 60 mmol) was added dropwise to a stirred solution of TAS trimethyldifluorosilicate (16.5 g) in out-gassed acetonitrile (60 mL), cooled to −10° under nitrogen. The reaction mixture was stirred for 1 h at −10° and then allowed to warm to ambient temperature. Volatiles were removed under vacuum to give a yellow oil (18.5 g). Elemental analysis and $^1$H NMR and $^{19}$F NMR (CD$_3$CN) confirmed the title product in good purity.

Part B. Polymerization of MMA Catalyzed by TAS 4-Nitrophenolate

A solution of MTS (0.75 g, 4.31 mmol) in THF (15 mL) was treated with a THF solution of the TAS 4-nitrophenolate (0.05 g in 0.5 mL of THF) prepared in Part A. MMA (5 mL) was then added by syringe. Exothermic temperature rise was controlled by a cooling bath. After 1 h at room temperature, a further 5 mL of MMA was added, again followed by a temperature rise. After cooling and solvent removal, 11.5 g of the expected polymer was obtained. GPC: $\overline{M}_n$ 1890, $\overline{M}_w$ 2180, D 1.15.

EXAMPLE 4

Part A. Tris(dimethylamino)sulfonium Acetate (Acetyloxy)trimethylsilane (14 mL, 94 mmol) was added dropwise to a stirred solution of TAS trimethyldifulorosilicate (24.7 g, 87.7 mmol) in out-gassed acetonitrile (75 mL), cooled to −10° under nitrogen. The solution was stirred for 30 minutes at 0°, warmed to ambient temperature and evaporated under vacuum to give 20.6 g of a white solid which was shown by elemental analysis and $^1$H NMR (CDCl$_3$) to be the title compound.

Part B. Polymerization of MMA Catalyzed by TAS Acetate

To a solution of MTS (0.75 g) in THF was added 0.05 g of TAS acetate, prepared in Part A, dissolved in THF. MMA (5 mL) was added and the exotherm which occurred was controlled by a cooling bath. After 1 h, 5 mL of MMA was added and the temperature rose to 45°. After 1 h, a third 5 mL portion of MMA was added, again followed by an exotherm. After volatiles removal, 19.6 g of the expected polymer was recovered. GPC: $\overline{M}_n$ 2920, $\overline{M}_w$ 9260, D 3.17.

EXAMPLE 5

Part A. Tetraethylammonium 4-Nitrophenolate

A mixture of 4-nitrophenol (13.9 g, 0.10 mol) and benzene (250 mL) was treated with tetraethylammonium hydroxide (14.7 g, 0.10 mol), added as a 20% aqueous solution. The mixture was heated under reflux until all water was removed by azeotropic distillation. The solution was allowed to cool with continued stirring. Upon standing, 25.4 g of a yellow solid was obtained; it was recrystallized from THF. $^1$H NMR (CDCl$_3$) confirmed the title compound.

Part B. Polymerization of MMA Catalyzed by Tetraethylammonium 4-Nitrophenolate

To a solution of MTS (0.75 g) in THF (20 mL) was added 0.075 g of tetraethylammonium 4-nitrophenolate, prepared in Part A, and the resulting mixture was treated with MMA (5 mL). The exotherm which was obtained was controlled to below 35° by a cold bath and slow rate of MMA addition. After 1 h at room temperature, 5 mL of MMA was added; an exotherm was obtained and the above procedure was repeated. After 1 h at room temperature, a third 5 mL portion of MMA was added and an exotherm was again noted. After removal of volatiles, 17.8 g of the expected polymer was obtained. GPC: $\overline{M}_n$ 2900, $\overline{M}_w$ 3950, D 1.36.

EXAMPLE 6

Polymerization of Methyl Methacrylate Catalyzed by Tetraethylammonium Nitrite

Tetraethylammonium nitrite was prepared by the reaction of silver nitrite and tetraethylammonium chloride in water. To a stirred solution of 0.87 g (1.0 mL, 5 mmol) of MTS, and 20 µL of 1M tetraethylammonium nitrite/acetonitrile in 20 mL of acetonitrile was added 10 g (10.8 mmol) of methyl methacrylate (purified by passage over neutral alumina under argon). One h after the end of the exothermic reaction an aliquot was removed for analysis by GPC and the poly(methyl methacrylate) (PMMA) was found to have $\overline{M}_n$ 1880, $\overline{M}_w$ 2470, D 1.32 (Theor. $\overline{M}_n$ 2100) with less than 1% of a high molecular weight component ($\overline{M}_n$ 1,333,000) by GPC. Addition of 5 g (5.4 mL, 50 mmol) of methyl methacrylate gave an exothermic reaction. After 30 min, 3 mL of methanol was added and the solution was evaporated in vacuo to 15.2 g of solid poly(methyl methacrylate). The PMMA had an $\overline{M}_n$ 2630, $\overline{M}_w$ 3170, D 1.20 (theor. $\overline{M}_n$ 3100) with less than 1% of a high molecular weight component ($\overline{M}_n$ 1,839,000).

EXAMPLE 7

Polymerization of Methyl Methacrylate Catalyzed by Tetrabutylammonium Nitrite

To a stirred solution of 20 µL of 1M tetrabutylammonium nitrite/acetonitrile in 25 mL of tetrahydrofuran was added 10 g (10.8 mL, 100 mmol) of methyl methacrylate, purified as in Example 6. After 3 mL of the monomer had been added, the addition was stopped for 1 h, after which time an aliquot of the reaction mixture was removed for analysis for polymer. GPC analysis showed the absence of detectable polymer. Then 0.87 g (1.0 mL, 5 mmol) of MTS was added, giving an exothermic reaction. The remaining methyl methacrylate was then added. After 1 h, an aliquot of the reaction mixture was removed for GPC analysis: $\overline{M}_n$ 2070, $\overline{M}_w$ 2450, D 1.18 (theor. $\overline{M}_n$ 2100). Then, 5 g (5.4 mL, 50 mmol) of methyl methacrylate was added, giving an exothermic polymerization, indicating that the polymer was "living". Removal of solvent in vacuo gave 16.5 g of solid poly(methyl methacrylate): $\overline{M}_n$ 2840, $\overline{M}_w$ 3690, D 1.30 (theor. $\overline{M}_n$ 3100).

EXAMPLE 8

Polymerization of Methyl Methacrylate Catalyzed by Tetraethylammonium Cyanate

To a solution of 20 µL of 1M tetraethylammonium cyanate/acetonitrile in 25 mL of tetrahydrofuran was added 10 g (10.8 mL, 100 mmol) of methyl methacrylate, purified as in Example 6. After 3 mL of the monomer was added, the addition was stopped for 1 h, after which time an aliquot of the reaction mixture was removed for analysis for polymer. GPC analysis showed the absence of detectable polymer. Then, 0.87 g (1.0 mL, 5 mmol) of MTS was added, giving an exothermic reaction. The remaining methyl methacrylate was then added. After 1 h an aliquot of the reaction mixture was removed for GPC analysis: $\overline{M}_n$ 2690, $\overline{M}_w$ 3240, D 1.20 (theor. $\overline{M}_n$ 2100). Then, 5 g (5.4 mL, 50 mmol) of methyl methacrylate was added, giving an exothermic polymerization, indicating that the polymer was "living". Removal of the solvent in vacuo gave 16.5 g of solid poly(methyl methacrylate): $\overline{M}_n$ 4130, $\overline{M}_w$ 5360, D 1.30 (theor. $\overline{M}_n$ 3100).

EXAMPLE 9

Polymerization of Butyl Acrylate Catalyzed by Tetraethylammonium Cyanate

To a stirred solution of 0.44 g (0.5 mL, 2.5 mmol) of MTS and 20 µL of 1M tetraethylammonium cyanate/acetonitrile in 40 mL of tetrahydrofuran was added slowly 32 g (35.8 mL, 250 mmol) of butyl acrylate, purified by passage over a short column of neutral alumina under argon. The exothermic polymerization occurred slowly during monomer addition and accelerated after the monomer was added. Two more additions of 20 µL of 1M tetraethylammonium cyanate/acetonitrile were made, producing a small exotherm with the first addition and no exotherm with the final addition. After addition of 3 mL of methanol, evaporation in vacuo gave 36 g of liquid residue. NMR analysis showed the presence of 92.2% poly(butyl acrylate) and 7.8% butyl acrylate. GPC analysis of the polymer showed $\overline{M}_n$ 9510, $\overline{M}_w$ 23900, D 2.52 (theor. $\overline{M}_n$ 12,900).

EXAMPLE 10

Polymerization of Ethyl Acrylate Catalyzed by Tetrabutylammonium Cyanate

To a solution of 0.87 g (1.0 mL, 5 mmol) of MTS and 20 μL of 1M tetrabutylammonium cyanate/tetrahydrofuran in 20 mL, of tetrahydrofuran was added 10 g (10.8 mL, 100 mmol) of ethyl acrylate, purified as in Example 6. The initial exotherm faded after 2 mL of monomer was added and resumed after all of the monomer had been added, carrying the temperature to 58°. After 1 h, addition of 5 g (5.4 mL, 50 mmol) of ethyl acrylate gave no exotherm. After 30 minutes, 3 mL of methanol was added, and the solution was evaporated in vacuo to provide 10 g of liquid poly-(ethyl acrylate). NMR analysis of the polymer showed the presence of a trace of ethyl acrylate. GPC analysis showed a bimodal distribution. With the principal fraction having $\overline{M}_n$ 6780, $\overline{M}_w$ 14800, D 2.18 (theor. $\overline{M}_n$ 2100).

EXAMPLE 11

Polymerization of Methyl Methacrylate Catalyzed by Tetrabutylammonium Cyanate To a solution of 0.87 g (1.0 mL, 5 mmol) of MTS and 71 mg (0.25 mmol) of tetrabutylammonium cyanate in 20 mL of acetonitrile was added 10 g (10.8 mL, 100 mmol) of methyl methacrylate purified as in Example 6. The exothermic polymerization continued throughout the monomer addition. One h after the end of the addition, 5 g (5.4 mL, 50 mmol) of methyl methacrylate was added, producing an exothermic polymerization. After 30 minutes 3 mL of methanol was added, and the solution was evaporated in vacuo to provide 16.3 g of solid poly(methyl methacrylate). GPC analysis showed a biomodal distribution (peak maxima at 2818 and 12,590) with $\overline{M}_n$ 2930, $\overline{M}_w$ 6690, D 3.03 (theor. $\overline{M}_n$ 3100).

EXAMPLES 12 to 46

General Procedure for the Polymerization of Methyl Methacrylate Catalyzed by Various Tetra(n-butyl)ammonium Oxyanion Salts To a 100 mL round-bottom flask containing a stirred solution of 30 mL of tetrahydrofuran and 0.20 mL (1.0 mmol) of MTS was added 0.02 mmol of tetrabutylammonium ("ate") catalyst (dissolved in acetonitrile in a concentration ranging from 0.28 to 0.55 molar). After 5 minutes 5.0 mL (46.7 mmol) of methyl methacrylate was added dropwise at a rate of 1.0 mL/min. The reaction mixture exothermed. Exactly one h from the time at which the peak temperature was observed, a 0.5 mL sample of polymer solution (A) was withdrawn, after which 5.0 mL (46.7 mmol) of methyl methacrylate was added at a rate of 1.0 mL/min. A similar, but usually slightly lower, maximum temperature accompanied the resulting exotherm. One h from the maximum exotherm temperature, a second 0.5 mL sample of polymer (B) was withdrawn and a third 5.0 mL (46.7 mmol) of methyl methacrylate was added at 1.0 mL/min. The third 0.5 mL sample of polymer (C) was withdrawn either one h from the peak exotherm temperature or 16 h later (the next morning). A fourth 5.0 mL (46.7 mmol) of methyl methacrylate was added (all at once) after the 16 h wait. If no exotherm followed this addition, an acetonitrile solution of 0.01 mmol of the "ate" catalyst was added and the total polymer solution was quenched with methanol after an additional two h. The polymer was precipitated from hexane, dried at 80°/20 mm and a final polymer sample (F) was taken. The four polymer samples were then analyzed by GPC.

Catalysts employed and the results obtained are given in Table 1. In Examples 12, 14, 15 and 46, molar amounts of biacetate, bibenzoate, acetate and acetic acid are shown. The bibenzoate/benzoic acid catalyst of Example 46 was prepared in situ by adding to a solution of tetrabutylammonium benzoate about 1.7 moles of benzoic acid per mole of benzoate salt. The catalysts of Examples 45 and 46 were dissolved in toluene instead of acetonitrile.

TABLE 1

| Ex. | OXYANION CATALYST | $\overline{M}_n$ (A) (THEOR.) | $\overline{M}_n$ (A)/D (OBS.) | $\overline{M}_n$ (B) (THEOR.) | $\overline{M}_n$ (B)/D (OBS.) | $\overline{M}_n$ (C) (THEOR.) | $\overline{M}_n$ (C)/D (OBS.) | $\overline{M}_n$ (F) (THEOR.) | $\overline{M}_n$ (F)/D (OBS.) |
|---|---|---|---|---|---|---|---|---|---|
| 12 | 0.7 Biacetate/ 0.3 Acetate | 4780 | NA | 9460 | NA | 18,720 | 18,300[1]/2.08 | — | — |
| 13 | Benzoate | 4780 | 4500/1.38 | 9510 | 10,500/1.49 | 14,140 | 15,200/1.81 | 18,900 | 15,300/1.83 |
| 14 | 1.0 Biacetate/ 0.2 Acetic Acid | 4780 | 4450/1.28 | 9430 | 8,370/1.35 | 14,265 | 13,200/1.46 | 18,900 | 17,000/1.54 |
| 15 | 0.7 Acetate/ 0.3 Biacetate | 4780 | 4860/1.32 | 9420 | 9,560/1.50 | 14,230 | 17,200/1.54 | 19,100 | 18,600/1.51 |
| 16 | 4-Cyanobenzoate | 4780 | 4080/1.49 | 9560 | 7,510/1.44 | 14,490 | 13,900/1.26 | 19,543 | 11,800/1.48 |
| 17 | 4-Nitrobenzoate | 4780 | 4470/1.51 | 9590 | 9,500/1.32 | 14,550 | 12,900/1.62 | 19,704 | 13,700/1.52 |
| 18 | Picolinate | 4780 | 4350/1.50 | 9473 | 7,110/1.59 | 14,400 | 11,900/1.61 | 19,331 | 14,900/1.67 |
| 19 | Acrylate | 4780 | 4710/1.29 | 9473 | 9,040/1.59 | 14,374 | 13,900/1.61 | 19,434 | 12,600/1.84 |
| 20 | 4-Methoxybenzoate[2] | 4780 | 4830/1.27 | 9575 | 10,000/1.28 | 14,607 | 14,700/1.30 | 19,782 | 14,100/1.42 |
| 21 | Phenolate | 4780 | 3340/2.62 | — | — | — | — | — | — |
| 22 | 2-Nitrobenzoate[3] | 4780 | NA | 9600 | 10,100/1.98 | 14,200 | 8,630/2.13 | — | — |
| 23 | 4-Chlorobenzoate | 4780 | 4660/1.61 | 9505 | 8,200/1.72 | 14,452 | 14,000/1.72 | 19,528 | 14,800/2.12 |
| 24 | 4-Methylbenzene sulfinate | 4780 | NA | 9460 | 7,860/1.18 | 14,330 | 12,700/1.26 | 19,314 | 12,700/1.27 |
| 25 | 2-Nitrophenolate | 4780 | 6410/1.14 | 9560 | 11,800/1.17 | 14,460 | 18,100/1.30 | 19,455 | 17,600/1.31 |
| 26 | 3-Nitrophenolate | 4780 | 4860/1.06 | 9650 | 9,960/1.16 | 14,550 | 19,300/1.14 | 19,300 | Trimodal |
| 27 | Bi(4-Nitrophenolate) | 4780 | 4850/1.04 | 9560 | 9,610/1.06 | 14,490 | 15,200/1.12 | 19,530 | 18,900/1.39 |
| 28 | 4-Trifluoromethyl-benzoate | 4780 | 4410/1.10 | 9620 | 8,580/1.06 | 14,570 | 14,100/1.07 | 19,580 | 17,000/1.20 |
| 29 | p-Toluene-sulfinate[4] | 4780 | 4370/1.24 | 9600 | 9,100/1.09 | 14,500 | 9,950/1.16 | — | — |
| 30 | 4-Cyanophenolate | 4780 | 4940/1.09 | 9580 | Bimodal | — | — | — | — |
| 31 | 2,4,6-Trichloro- | 4780 | 4420/1.36 | 9680 | 8,650/1.21 | 14,500 | 13,500/1.25 | 19,500 | 13,400/1.31 |

TABLE 1-continued

| Ex. | OXYANION CATALYST | $\overline{M}_n$ (A) (THEOR.) | $\overline{M}_n$ (A)/D (OBS.) | $\overline{M}_n$ (B) (THEOR.) | $\overline{M}_n$ (B)/D (OBS.) | $\overline{M}_n$ (C) (THEOR.) | $\overline{M}_n$ (C)/D (OBS.) | $\overline{M}_n$ (F) (THEOR.) | $\overline{M}_n$ (F)/D (OBS.) |
|---|---|---|---|---|---|---|---|---|---|
|  | phenolate |  |  |  |  |  |  |  |  |
| 32 | Pentafluorophenolate | 4780 | 4210/1.25 | 9500 | 7,890/1.15 | 14,500 | — | 19,300 | 14,600/1.32 |
| 33 | 3-Nitrobenzoate | 4780 | 3370/1.43 | 9500 | 7,120/1.22 | 14,500 | — | 19,300 | 17,800/1.33 |
| 34 | 3-Chlorobenzoate | 4780 | 4340/1.18 | 9500 | 8,960/1.11 | 14,500 | 13,600/1.17 | 19,300 | 17,600/1.35 |
| 35 | 4-(methylsulfonyl)-benzoate | 4780 | 4170/1.24 | 9500 | 8,420/1.17 | 14,500 | 13,900/1.21 | 19,300 | 15,500/1.31 |
| 36 | 4-Fluorophenolate | 4780 | 5190/1.10 | 9500 | 10,200/1.35 | 14,500 | — | 19,300 | 14,600/1.92 |
| 37 | 4-Methoxyphenolate | 4780 | 5350/1.11 | 9500 | 11,200/1.27 | 14,500 | — | 19,300 | 15,700/1.92 |
| 38 | Pentachlorophenolate | 4780 | 3470/1.43 | — | — | — | — | — | — |
| 39 | Cyanoacetate | 4780 | 6160/1.55 | — | — | — | — | — | — |
| 40 | N—Methyl p-Toluene-sulfonamidate | 4780 | 4510/1.07 | 9500 | 9,370/1.33 | 14,500 | 17,800/1.48 | 19,300 | 14,200/1.67 |
| 41 | Phenylphosphinate | 4780 | 5300/1.11 | 9500 | 10,700/1.26 | 14,500 | 17,300/1.42 | 19,300 | 15,800/1.53 |
| 42 | 4-Nitrophenolate | 4780 | 4930/1.16 | 9500 | 9360/1.28 | 14,500 | 14,900/1.34 | — | — |
| 43 | Bi(3-Chlorobenzoate) | 4780 | 4650/1.03 | 9500 | 9030/1.05 | 14,500 | 14,000/1.09 | 19,300 | 19,000/1.18 |
| 44 | Biphenolate | 4780 | 4470/1.06 | 9500 | 7910/1.23 | 14,500 | 12,600/1.29 | 19,000 | 13,200/1.36 |
| 45 | Benzoate | 4780 | 4170/1.52 | 9420 | 4540/1.48 | — | — | — | — |
| 46 | 1.0 Bibenzoate/0.7 Benzoic Acid | 4780 | 4680/1.06 | 9500 | 8170/1.12 | 14,500 | 14,200/1.16 | 19,300 | 13,900/1.23 |

[1] 10 ml MMA added.
[2] Used 0.01 mmol catalyst (½ of normal).
[3] 2nd aliquot of monomer added after 1 day; 3rd added after 3 more days.
[4] Run in dimethylformamide instead of THF; 3rd aliquot of MMA was added the next day.
D = polydispersity
NA = not available
— = no monomer added in this step

EXAMPLE 47

Polymerization of Methacrylate Monomers Catalyzed by Various Tetra(n-butyl)ammonium Oxyanion Salts A fluorinated methacrylate (5 g) of the formula $CH_2=CH(CH_3)CO_2CH_2CH_2R_f$ wherein $R_f$ is perfluoroalkyl of 1 to 20 carbon atoms, or a mixture thereof, was mixed with MTS initiator (0.2 mL, 1 mmol); to this mixture was added a solution (0.2 mL) of the tetra(n-butyl)ammonium salt dissolved in trifluoromethylbenzene (TFB)(0.01 mol of salt in 10 g of TFB). Heat generated by the polymerization, and the rate at which cloudiness developed in the polymerizing system, were used to rate catalyst effectiveness, as shown in Table 2 wherein effectiveness increases on a scale of 0 (no detectable polymerization) to 10.

Salts were prepared by known methods, most generally by reacting the conjugate acids with tetra(n-butyl)ammonium(TBA)hydroxide.

The TBA salts of adipic and boric acids produced little or no polymerization of the fluorinated methacrylate monomer. However, when that monomer was replaced with 2-ethylhexyl methacrylate, vigorous polymerization was observed with these salts. It was also found that the base tetra(n-butyl)ammonium hyroxide catalyzed polymerization of 2-ethylhexyl methacrylate but not the fluorinated methacrylate monomer.

The TBA salts of $R_fCO_2H$, for example, $CF_3CO_2H$, and of p-toluenesulfonic acid produced little or no polymerization; the pKa of these acids is below 5 and the salts are outside this invention.

TABLE 2

| Conjugate Acid | Rating |
|---|---|
| Acetic | 10 |
| Pivalic | 7 |
| Valeric | 8 |
| Hexanoic | 8 |
| Octanoic | 7 |
| 2-Ethyl Hexanoic | 8 |
| Benzoic | 4 |
| o-Toluic | 5 |
| Adipic | 0 |

TABLE 2-continued

| Conjugate Acid | Rating |
|---|---|
| $R_fCO_2H$ | 0 |
| $R_fCH_2CO_2H$ | 2 |
| p-Toluenesulfonic | 0 |
| $(C_8F_{17}CH_2CH_2O—)_2PO_2H$ | 1 |
| $H_3PO_4$ | 3 |
| $R_fCH_2CH_2SCH_2CH_2CO_2H$ | 6 |
| $H_3BO_4$ | 0 |
| Phenol | 3 |
| o-Phenoxybenzoic | 1 |
| p-Anisic | 2 |
| p-Toluic | 2 |

EXAMPLE 48

Polymerization of MMA in the Presence of 2-Methylphenylacetonitrile as Chain Transfer Agent Catalyzed by 3-Chlorobenzoate This example corresponds to Example 9 in commonly assigned application Ser. No. 676,099 (supra).

To a solution of 0.1 mL (0.5 mmol) of MTS and 20 μL of 0.46M tetrabutylammonium m-chlorobenzoate/acetonitrile in 30 mL of tetrahydrofuran was added a solution of 459 mg (0.466 mL, 3.5 mmol) of 2-methylphenylacetonitrile in 10.8 mL (100 mmol) of methyl methacrylate. After the monomer chain transfer agent had been added, a slow exotherm began and the temperature gradually rose 22° and then slowly fell. NMR analysis showed 94% conversion to polymer. Precipitation with aqueous methanol gave 9.6 g of poly(methyl methacrylate). GPC: $\overline{M}_n$ 4420, $\overline{M}_w$ 10,700, D 2.42 (theor. $\overline{M}_n$ for no chain transfer 18,900; for initiation only by 2-methylphenylacetonitrile 2816). U.V.: $k_{258}=0.054$ corresponding to a $\overline{M}_n$ of 3190 per phenyl group.

BEST MODE FOR CARRYING OUT THE INVENTION

The best mode presently contemplated for carrying out the invention is illustrated by Examples 2–8, 10, 12–20, 22–29, 31–37 and 40–48, provided, however, it is to be understood that the best mode will depend on a variety of factors, which will be obvious to the skilled artisan who reads this specification. For example, as is evident from Example 47, Table 2, the oxyanions vary in their activity as a catalyst. For some applications, particularly commercial applications, it is essential to take into consideration such factors as polymerization temperature, solvent medium, reactor size and type, initiator, monomer(s), polymerization rate desired, conversion, yield, recycling capabilities and polymer processing. The point to be made is that, referring again to Table 2, the most active oxyanion catalysts are not necessarily the best catalysts for each and every application. Selection of catalyst, therefore, will depend on the role which the catalyst will play in the overall scheme of the polymerization to be carried out. Moreover, as can be seen from Table 1 (Examples 12 to 46), catalyst selection influences certain properties, such as molecular weight and polydispersity (D), of the polymer produced, and the life span of "living" ends of the polymer chains.

We claim:

1. Polymerization process comprising contacting under polymerizing conditions at least one polar, acrylic type alpha-olefinic monomer with (i) a tetracoordinate organosilicon, organotin or organogermanium polymerization initiator having at least one initiating site, and (ii) a catalyst which is a salt comprising a suitable cation and an oxyanion which can form a conjugate acid having a pKa (DMSO) of about 5 to about 24.

2. Process of claim 1 wherein the polar monomer is selected from the group consisting of $CH_2=C(Y)X$,

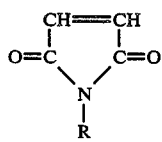

and mixtures thereof wherein:

X is $-CN$, $-CH=CHC(O)X'$ or $-C(O)X'$;

Y is $-H$, $-CH_3$, $-CN$ or $-CO_2R$, provided, however, when X is $-CH=CHC(O)X'$, Y is $-H$ or $-CH_3$;

X' is $-OSi(R^1)_3$, $-R$, $-OR$ or $-NR'R''$; each $R^1$, independently, is H or a hydrocarbyl radical which is an aliphatic, alicyclic, aromatic or mixed aliphatic-aromatic radical containing up to 20 carbon atoms, provided that at least one $R^1$ group is not H;

R is a hydrocarbyl radical which is an aliphatic, alicyclic, aromatic or mixed aliphatic-aromatic radical containing up to 20 carbon atoms, or a polymeric radical containing at least 20 carbon atoms, any of said radicals optionally containing one or more ether oxygen atoms within aliphatic segments thereof, optionally containing one or more functional substituents that are unreactive under polymerizing conditions, and optionally containing one or more reactive substituents of the formula $-Z'-(O)C-C(Y^1)=CH_2$ wherein $Y^1$ is H or $CH_3$ and $Z'$ is O or NR'; and each of R' and R'' is independently selected from $C_{1-4}$ alkyl.

3. Process of claim 2 wherein the initiator is selected from the group consisting of $(R^1)_3MZ$, $(R^1)_2M(Z^1)_2$ and $O[M(R^1)_2Z^1]_2$ wherein:

$R^1$ is as defined for the monomer;

Z is an activating substituent selected from the group consisting of

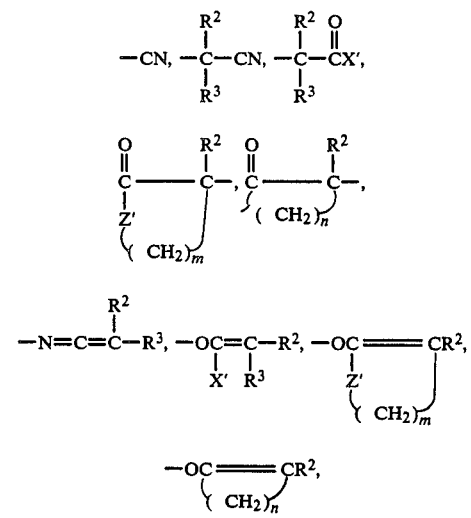

$-SR$, $OP(NR'R'')_2$, $-OP(OR^1)_2$, $-OP[OSi(R^1)_3]_2$ and mixtures thereof;

$Z^1$ is the activating substituent

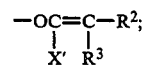

R, $R^1$, R', R'', X' and Z' are as defined above for the monomer;

each of $R^2$ and $R^3$ is independently selected from H and hydrocarbyl, defined as for R above;

m is 2, 3 or 4; 'n is 3, 4 or 5; and

M is Si, Sn or Ge, provided, however, when Z is

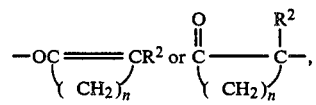

M is Sn or Ge, (a) at least one of any R, $R^2$ and $R^3$ in the initiator optionally containing one or more initiating substituents of the formula $-Z^2-M(R^1)_3$ wherein M and $R^1$ are as defined above;

$Z^2$ is an activating diradical selected from the group consisting of

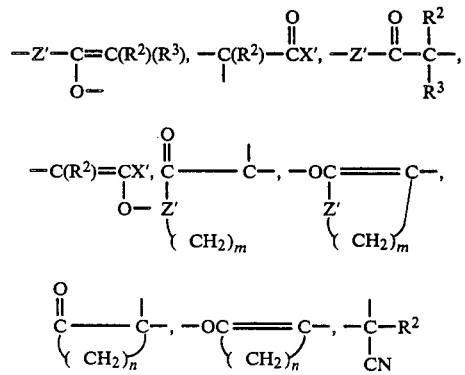

thereof, wherein $R^2$, $R^3$, $X'$, $Z'$, m and n are as defined above, provided, however, when $Z^2$ is

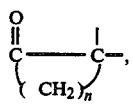

M is Sn or Ge, (b) $R^2$ and $R^3$ taken together are

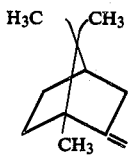

if Z is

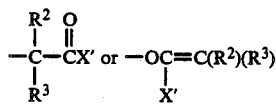

and/or $Z^2$ is

and (c) X' and either $R^2$ or $R^3$ taken together are

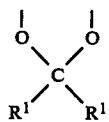

if Z is

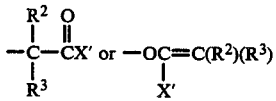

and/or $Z^2$ is

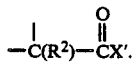

4. Process of claim 1 wherein the conjugate acid has a pKa (DMSO) of $6 < pKa < 21$.

5. Process of claim 1 wherein the conjugate acid has a pKa (DMSO) of $8 < pKa < 18$.

6. Process of claim 3 wherein the conjugate acid has a pKa (DMSO) of $6 < pKa < 21$.

7. Process of claim 3 wherein the conjugate acid has a pKa (DMSO) of $8 < pKa < 18$.

8. Process of claim 1 wherein the conjugate acid is of the formula $[Q(X^1OH)_p]_q$ wherein Q, of valence p, is CN, N(O), P(O), PH(O), $R^4$ or $R^4_3$ Si;

each $R^4$, independently, is $C_{1-20}$ hydrocarbyl or a polymeric radical containing at least 20 carbon atoms;

$X^1$ is C(O), S(O) or a single bond; and each of p and q is an integer and is at least 1.

9. Process of claim 8 wherein $X^1$ is C(O).

10. Process of claim 9 wherein Q is CN or N(O) and each of p and q is 1.

11. Process of claim 9 wherein Q is $R^4$ and q is 1 or 2.

12. Process of claim 11 wherein $R^4$ is $C_{1-20}$ hydrocarbyl.

13. Process of claim 12 wherein $R^4$ is $C_{1-8}$ alkyl, phenyl or substituted phenyl and q is 1 or 2.

14. Process of claim 8 wherein $X^1$ is a single bond.

15. Process of claim 14 wherein Q is $R^4$ which is phenyl or substituted phenyl and q is 1 or 2.

16. Process of claim 8 wherein $X^1$ is S(O) and Q is $R^4$.

17. Process of claim 16 wherein $R^4$ is $C_{1-20}$ hydrocarbyl.

18. Process of claim 17 wherein $R^4$ is phenyl or substituted phenyl and q is 1 or 2.

19. Process of claim 1 wherein the oxyanion is a monooxyanion.

20. Process of claim 1 wherein the oxyanion is a bioxyanion.

21. Process of claim 1 wherein the oxyanion is a mixture comprising mono- and bioxyanions.

22. Process of claim 21 wherein the mixture contains a conjugate acid having a pKa (DMSO) of about 5 to about 24.

23. Process of claim 19 wherein the oxyanion is a carboxylate.

24. Process of claim 23 wherein the oxyanion is acetate, benzoate or substituted benzoate.

25. Process of claim 24 wherein the substituted benzoate is a chlorobenzoate.

26. Process of claim 20 wherein the bioxyanion is biacetate, bibenzoate or substituted bibenzoate.

27. Process of claim 19 wherein the oxyanion is a phenolate or substituted phenolate.

28. Process of claim 20 wherein the bioxyanion is a biphenolate or bi(substituted phenolate).

29. Process of claim 1 wherein the oxyanion is a sulfinate.

30. Process of claim 29 wherein the oxyanion is an aryl- or substituted aryl sulfinate.

31. Process of claim 1 wherein the oxyanion is a nitrite or cyanate.

32. Process of claim 1 wherein the suitable cation is a quaternary ammonium, tris(dialkylamino)sulfonium or an alkali or alkaline earth metal cation.

33. Process of claim 32 wherein the cation is a tetraalkylammonium cation.

34. Process of claim 33 wherein the cation is tetrabutylammonium.

35. Process of claim 32 wherein the cation is tris(dimethylamino)sulfonium.

36. Process of claim 24 wherein the suitable cation is tetraalkylammonium.

37. Process of claim 36 wherein the cation is tetrabutylammonium.

38. Process of claim 37 wherein the oxyanion salt is tetrabutylammonium acetate.

39. Process of claim 25 wherein the oxyanion salt is tetrabutylammonium m-chlorobenzoate.

40. Process of claim 26 wherein the suitable cation is tetraalkylammonium.

41. Process of claim 40 wherein the cation is tetrabutylammonium.

42. Process of claim 27 wherein the suitable cation is tetraalkylammonium.

43. Process of claim 42 wherein the cation is tetrabutylammonium.

44. Process of claim 28 wherein the suitable cation is tetraalkylammonium.

45. Process of claim 44 wherein the cation is tetrabutylammonium.

46. Process of claim 21 wherein the mixture comprises mono- and bicarboxylates.

47. Process of claim 21 wherein the mixture comprises mono- and biphenolates or mono- and bi(substituted phenolates).

48. Process of preparing the mixture of claim 21 wherein a suitable monooxyanion salt is reacted in situ with one or more conjugate acids having a pKa (DMSO) of about 5 to about 24.

49. Process of claim 48 wherein one equivalent of salt is reacted with 0.1 to about 2 equivalents of conjugate acid.

50. Process of claim 1 wherein the polymer produced is "living" and contains the silicon, germanium or tin of the initiator at "living" ends.

51. Process of claim 3 wherein the polymer produced is "living" and contains the silicon, germanium or tin of the initiator at "living" ends.

52. Process of claim 20 wherein the bioxyanion is admixed with a conjugate acid having a pKa (DMSO) of about 5 to about 24.

* * * * *